March 21, 1933. E. G. T. GUSTAFSSON 1,902,638
METHOD OF MELTING METALS IN ELECTRIC FURNACES
Filed April 28, 1930
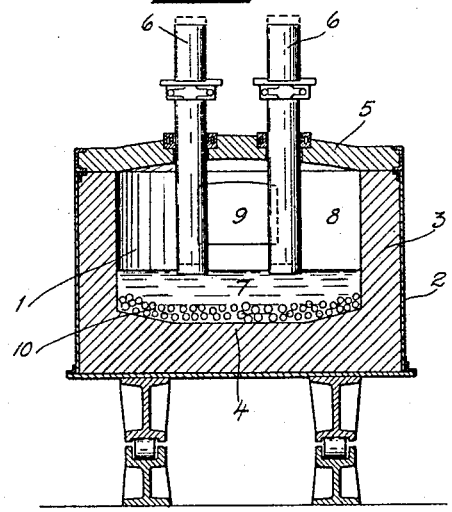
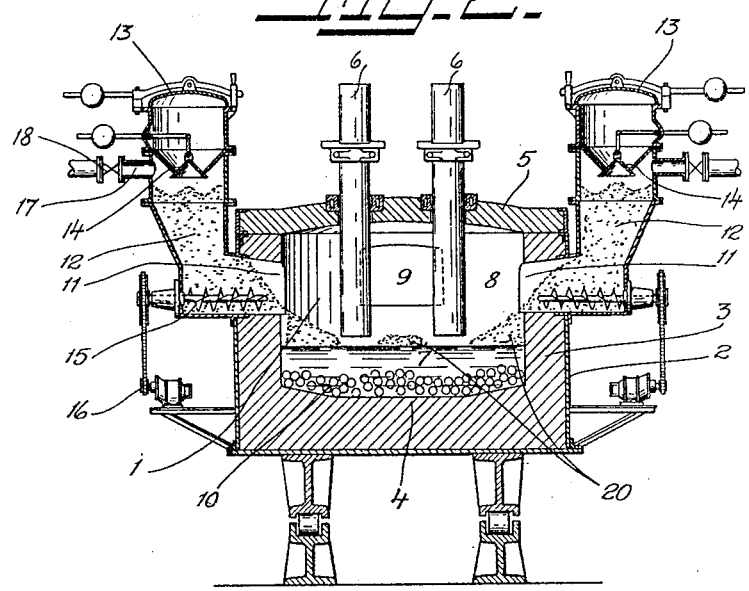
INVENTOR
Emil G. T. Gustafsson.

Patented Mar. 21, 1933

1,902,638

UNITED STATES PATENT OFFICE

EMIL GUSTAF TORVALD GUSTAFSSON, OF STOCKHOLM, SWEDEN

METHOD OF MELTING METALS IN ELECTRIC FURNACES

Application filed April 28, 1930, Serial No. 448,185, and in Sweden May 7, 1929.

The present invention relates to a method of melting in an electric electrode furnace metals, for instance of the iron group and of the chromium group, and alloys of such metal or metals and one or more other metals, such as silicon, manganese, vanadium and aluminium.

When melting such metal according to methods heretofore used it has been proved, especially if the metal contains metal with great affinity to oxygen, for instance chromium, manganese, canadium or silicon, that an appreciable part of the metal or its constituents, respectively, will be oxidized during the melting on account of the contact with oxidizing gases in the furnace. It has, for instance, been found very difficult to utilize effectively the scrap falling in the production of ingots, intermediate products and articles of so called rustless or acid resistant iron and steel with a high percentage of chromium and, in some cases, of nickel for the production of new ingot metal of similar composition. If such scrap is melted in an electric electrode furnace, for instance of the Heroült-type, in the usual manner the metal will come in contact with air in the furnace, so that the chromium will be oxidized to a very considerable degree, and likewise the metal will, at least in part, come in contact with the electrodes whereby an undesirable carbonization will occur. In many places such scrap is therefore only paid for as common steel scrap, whereas its value would be much higher if the chromium content could be effectively utilized through remelting the metal.

The main object of the present invention is to bring about an effective protection of the metal during the melting against the oxidizing action of the atmosphere in the furnace. To this end a slag bath of a suitable depth and of a suitable composition is prepared in an electric furnace provided with one or more electrodes directed against the bath and capable of being raised and lowered, and the metal is melted wholly or in the main part covered by this molten slag in the furnace while operating the furnace in such manner that the heat required for the melting is developed wholly or in the main part by electric resistance in the slag. The melting may suitably take place under or in a slag bath containing oxide or oxides of metal or metals, respectively, contained in the metal, for instance chromium oxide when melting steel containing chromium, whereat the slag is suitably obtained in the production of such metal as is to be melted or in a preceding melting of similar metal.

Another object of the invention is to protect the metal effectively during the melting against carbonization by the carbon in the electrodes when carbon containing electrodes are used. To this end the furnace is operated during the melting in such manner that the main part of the heat required for melting the metal is developed by electric resistance within the slag but without the electrodes coming in contact with the slag, or in other words the electrodes are held in such positions relatively to the slag bath that short arcs are formed between the electrodes and the slag bath, but the slag bath is kept so deep that yet the very greatest part of the heat is developed in the slag. Consequently, the furnace should be operated with such total voltage drop between each electrode and the bath of molten metal forming under the slag bath that the voltage drop in the slag amounts to the greatest part of said total voltage drop.

As the melting takes place without the metal coming in contact with the atmosphere in the furnace the metal cannot be subjected to oxidizing by oxidizing constituents that may be contained in the same. If an the slag the content of oxides of the metals contained in the solid metal is adapted in a suitable manner no mentionable oxidizing by the slag can occur. On account of a furnace with development of heat in the slag being used, it is easy to adapt the distribution of heat in the furnace in such a way that the heat required for melting the metal will be supplied to the slag being in contact with the metal without the temperature above the slag bath becoming so high as to jeopardize the furnace lining.

If the slag contains any appreciable quantity of metal oxide and carbonaceous electrodes are used the furnace should be operated during the melting with the electrodes out of contact with the slag in order to prevent reduction of metal out of the slag. Metal reduced by means of the electrodes would be rich in carbon whereby a carbonization of the metal bath in the furnace would take place. If thereby a smooth and bright surface would be formed on the slag bath, causing a sharp radiation against the arch and the walls of the furnace, the surface may be dulled, for instance, by throwing pulverous coke or charcoal on the slag bath, especially if metal with a high or a comparatively high carbon content is melted.

The metal that is to be melted under or in the slag may be supplied into the furnace at one time, for instance at the beginning of the heat, or, preferably, continuously or successively in small portions during the course of the heat. In the latter case a less quantity of slag is required in the furnace. If the metal is at hand in form of voluminous scrap or the like it may suitably be compressed to or cut into small pieces, in order that it will be to the greatest possible degree completely covered by the slag during the melting.

For the melting any common electric steel furnace, provided with electrodes operating against the bath, may be used since these furnaces are as a rule provided with such electric equipments that they may be operated with ohmic resistances between each electrode and the metal bath in the furnaces as low as 0.010 to 0.017 ohm, i. e. that the greatest part of the energy may be developed in the slag. Such furnaces can thus be operated mainly with resistance in the slag and with only very short arcs. The slag resistance per cm. depth of the slag bath being, on an average, about 0.0015 ohm, a slag bath of a considerable depth must be used to obtain the sufficient resistance in the slag. From this point of view as a rule a slag bath of a depth of at least 10 cm. is required. Such a slag depth is, however, also required to get the metal covered by slag during the melting; in many cases the slag bath should be kept still deeper.

As thus a great quantity of slag should be at hand in the furnace it is, at least in some cases, suitable to use a separate furnace for melting the metal whereat the refining and the further treatment of the metal is carried out in another furnace. Tapping of metal produced is thereby made at equal intervals according as the metal bath increases in depth. Moreover, it is always advantageous to keep the metal bath comparatively deep so that it covers the solid metal at least in part, as thereby the slag quantity need not be so great.

If the same furnace should be used for the further treatment of the metal, that is if only one furnace is used, the process may preferably be carried out in the following way.

When a suitable quantity of metal has been melted the slag is tapped to a ladle or a separate furnace which is transferred to a place where the ladle or the furnace can be protected against heat losses in an effective manner. In this ladle or furnace there are thereafter sunk two electrodes which by electric resistance heat keep the slag warm to the next melting. The supply of heat need only compensate the losses of heat from the slag. Through the contact with the electrodes there is indeed reduced some metal out of the slag, especially chrome when melting chromium containing metal, but the obtained metal rich in carbon will more than compensate the cost of keeping the slag warm. Besides some metal oxide must always be separated from the slag in order that the slag quantity shall not increase during the melting. A suitable portion of the slag should then be reintroduced into the furnace for the melting to form the slag bath for the next heat.

In order to prevent still more completely the influence of the atmosphere in the electric melting furnace on the metal, also via the slag, which both are relatively strongly oxidizing in the common steel furnaces during the melting, it may be suitable to execute the melting of the metal, for instance the scrap, under or in the slag at the same time as reducing and melting of a charge of oxide ore and reducing agent, carbonaceous or thermic, or incompletely reduced metal sponge or the like are carried out in the furnace, for instance with the charge floating on the slag or lying in the same as nowadays is the case in the direct production of metals out of their oxide ores. As well known such direct production is suitably performed in an electric furnace of the type hereinbefore mentioned while adapting the total resistance between each electrode and the bottom or the metal bath obtained in the furnace, respectively, to such a high value, 0.02—0.03—0.04—0.05—0.06 ohms per electrode that the heat will be developed by resistance in the slag as well as by arc between the electrode and the slag. This adaption is performed by using such a high voltage drop between each electrode and the bottom or the metal bath, in relation to the energy developed per electrode that the electrode will be held in such a position relatively to the slag bath that the desired total resistance in the slag and in the arc formed will be obtained. The deeper the slag bath is kept, the higher should, naturally, the total resistance be adapted.

When melting extra added metal under or in the slag simultaneously with reducing and/or melting in the furnace a charge developing reducing gas, the distribution of heat in the furnace should be regulated through adapting the voltage between each electrode and the bottom or the metal bath in the furnace, respectively, in relation to the energy developed per electrode that in the slag besides the slag heat required for the reduction and/or melting process alone will be developed the whole of or at least the main part of the heat required for melting the solid metal additionally introduced, i. e. the resistance per electrode should be decreased in a corresponding degree as compared with the resistance required for the reduction and/or melting process alone, so that a less part of the heat would be developed in the arc. It is evident that, if a very deep slag bath is used during the melting, higher resistance per electrode than that above mentioned may be suitable, in order that the electrodes should not come in contact with the slag bath.

In the manner set forth also spongy metal, for instance iron sponge, chrome sponge or chrome-iron sponge, may be melted whether the sponge is completely reduced or still contains unreduced ore and the required carbonaceous or thermic reducing agent for the remaining quantity of metal oxides. However, in some cases the sponge is so light that it tends to float in the slag and, consequently does not sink below the slag surface. To prevent such floating it is suitable either to increase the specific weight of the sponge by pressing or to adapt its composition in such way that it will be specifically heavier than the slag used or the slag formed in the melting, respectively.

In the accompanying drawing there are shown by way of example but by no means in limitation of the invention furnaces suitable for carrying out the invention.

Fig. 1 is a vertical section through an electric furnace for melting solid metal; Fig. 2 is a vertical section through a similar furnace modified for reducing and melting an oxide ore—carbon charge simultaneously with melting solid metal. Similar numerals refer to similar parts in both the figures.

In the drawing 1 represents a tilting furnace formed by the shell 2, the lining 3, the bottom 4 and the arch 5. Through the arch two electrodes 6 project against the slag bath 7 in the melting chamber 8 of the furnace. At the beginning of a melting campaign a slag bath 7 is formed in the furnace in known manner, preferably containing oxide of a readily oxidizable metal contained in the metal to be melted, for instance chromium oxide if the metal contains chromium. The metal is introduced in form of pieces into the furnace through the opening 9 provided with a suitable tightening door. The metal pieces sink through the slag bath 7 down onto the bottom 4 of the furnace and is melted lying as a layer 10 on the bottom. The furnace may be operated either with the electrodes dipping into the slag, as shown in Fig. 1, and thus practically with resistance heat solely, or with the electrodes near in contact with the slag bath, as shown by the dotted lines in the electrodes 6, in which case a small part of the heat would be developed by arcs between the electrodes and the slag.

If an ore-carbon-charge is to be reduced simultaneously in the furnace to maintain a really non-oxidizing atmosphere in same during the melting of the solid metal, a furnace according to Fig. 2 may advantageously be used. The charge is introduced into the furnace through the openings 11 from feeding-shafts 12 with double closures 13 and 14 by means of screw conveyors 15 rotated by any power means, for instance electric motors 16. As shown in the drawing, the charge may be reduced and melted lying in a thin layer 20 on the slag bath 7, if the rate of feeding, the composition of the slag and the composition of the charge are properly adapted. In this case the furnace should be operated with the electrodes in such positions that comparatively long arcs are formed between the electrodes and the slag bath in order to develop most of the heat at the surface of the slag bath where the consumption of heat is greatest. However, the electrodes should be kept in such positions that the main part or the whole of the heat necessary for melting the solid metal at the bottom of the furnace is yet developed by the electric resistance in the slag. Also in this case the solid metal is introduced through the opening 9. Any excess of gas developed from the ore-carbon-charge may be drawn off from the furnace through the pipes 17 in the feeding-shafts 12, the quantity of the gas and thereby the gas pressure in the furnace being controlled by means of the valves 18.

The method according to the invention is not bound to the metals or materials or furnace arrangements metioned above by way of example only, but comprises any melting of metals under or in a slag bath in an electric furnace of the type described with the use of the method set forth. The furnace may also be provided with one or more bottom electrodes or a conducting bottom without the invention being dependent thereon.

What I claim as new and desire to secure by Letters Patent of the United States of America is:—

1. A method of melting metals and metal alloys containing metal of the iron group, consisting in preparing a slag bath in a closed electric furnace having a downwardly extending electrode that can be raised and lowered, melting the metal practically completely covered by said slag, simultaneously reducing and melting in the furnace a charge containing oxide ore and reducing agent for producing similar metal as that to be melted with the charge floating on the slag, and adapting the heat development in the furnace by arc and by electric resistance in the slag bath so that the additional heat required for melting the solid metal is developed in the slag.

2. A method of melting metals and metal alloys containing an easily oxidizable element, consisting in preparing a slag bath in a closed electric furnace having a downwardly extending electrode that can be raised and lowered, melting the metal practically completely covered by said slag, simultaneously reducing and melting in the furnace a charge containing metal oxide and reducing agent, and adapting the heat development in the furnace by arc and by electric resistance in the slag bath so that the heat required for melting the solid metal is developed mainly in the slag.

3. A method of melting metals and metal alloys containing an easily oxidizable element, consisting in preparing a slag bath in a closed electric furnace having a downwardly extending electrode that can be raised and lowered, melting the metal practically completely covered by said slag, simultaneously reducing and melting in the furnace a charge containing metal oxide and reducing agent for producing similar metal as that to be melted, and adapting the heat development in the furnace by arc and by electric resistance in the slag bath so that the heat required for melting the solid metal is developed mainly in the slag.

4. A method of melting metals and metal alloys containing an easily oxidizable element, consisting in preparing a slag bath in a closed electric furnace having a downwardly extending electrode that can be raised and lowered, melting the metal practically completely covered by said slag, simultaneously reducing and melting in the furnace a charge containing metal oxide and reducing agent with the charge floating on and in the slag, and adapting the heat development in the furnace by arc and by electric resistance in the slag so that the heat required for melting the solid metal is developed mainly in the slag.

5. A method of melting metals and metal alloys containing an easily oxidizable element, consisting in preparing in a closed electric furnace having a downwardly extending electrode that can be raised and lowered a slag bath containing a considerable amount of oxide or oxides of metal or metals contained in the metal to be melted, melting the metal practically completely covered by said slag, simultaneously reducing and melting in the furnace a charge containing metal oxide and reducing agent, and adapting the heat development in the furnace by arc and by electric resistance in the slag bath so that the heat required for melting the solid metal is developed mainly in the slag.

6. A method of melting metals and metal alloys containing an easily oxidizable element, consisting in preparing a slag bath in a closed electric furnace having a downwardly extending electrode that can be raised and lowered, melting the metal practically completely covered by said slag when resting on the bottom of the furnace or lying in the metal bath formed, simultaneously reducing and melting in the furnace a charge containing metal oxide and reducing agent, operating the furnace in such manner that the heat required for melting the solid metal is developed mainly by electric resistance in the slag, and supplying the solid metal into the furnace successively during the melting.

7. A method of melting metals and metal alloys containing an easily oxidizable element, consisting in preparing in a closed electric furnace having a downwardly extending electrode that can be raised and lowered a metal bath of such metal as is to be melted and a slag bath, containing a considerable amount of oxide or oxides of metal or metals contained in the metal to be melted, over said metal bath, melting the solid metal lying in said metal bath and practically completely covered by said slag, simultaneously reducing and melting in the furnace a charge containing metal oxide and reducing agent, and adapting the heat development in the furnace by arc and by electric resistance in the slag bath so that the heat required for melting the solid metal is developed mainly in the slag.

8. A method of melting metals and metal alloys containing chromium, consisting in preparing a slag bath containing a considerable amount of chromium oxide in a closed electric furnace having a downwardly extending electrode that can be raised and lowered, melting the solid metal practically completely covered by said slag, simultaneously reducing and melting in the furnace a charge containing chromium oxide and reducing agent, and adapting the heat development in the furnace by arc and by electric resistance in the slag so that the heat required for melting the solid metal is developed mainly in the slag.

9. A method of melting metal sponge, consisting in preparing a slag bath in a closed electric furnace having a downwardly extending electrode that can be raised and lowered, adapting the specific weight of the sponge in relation to that of the slag by pressing the sponge so that the sponge sinks below the surface of the slag bath when introduced into the furnace, melting the sponge practically completely covered by said slag, simultaneously reducing and melting a charge containing oxide of metal contained in the metal sponge and reducing agent, and adapting the heat development in the furnace by arc and by electric resistance in the slag so that the heat required for melting the metal sponge is developed mainly in the slag.

In testimony whereof I affix my signature.
EMIL GUSTAF TORVALD GUSTAFSSON.